Jan. 10, 1967  L. L. GARDNER ETAL  3,297,929
TAPE PROGRAMMED MACHINE TOOL CONTROL SYSTEM
Filed Dec. 27, 1965  2 Sheets-Sheet 1
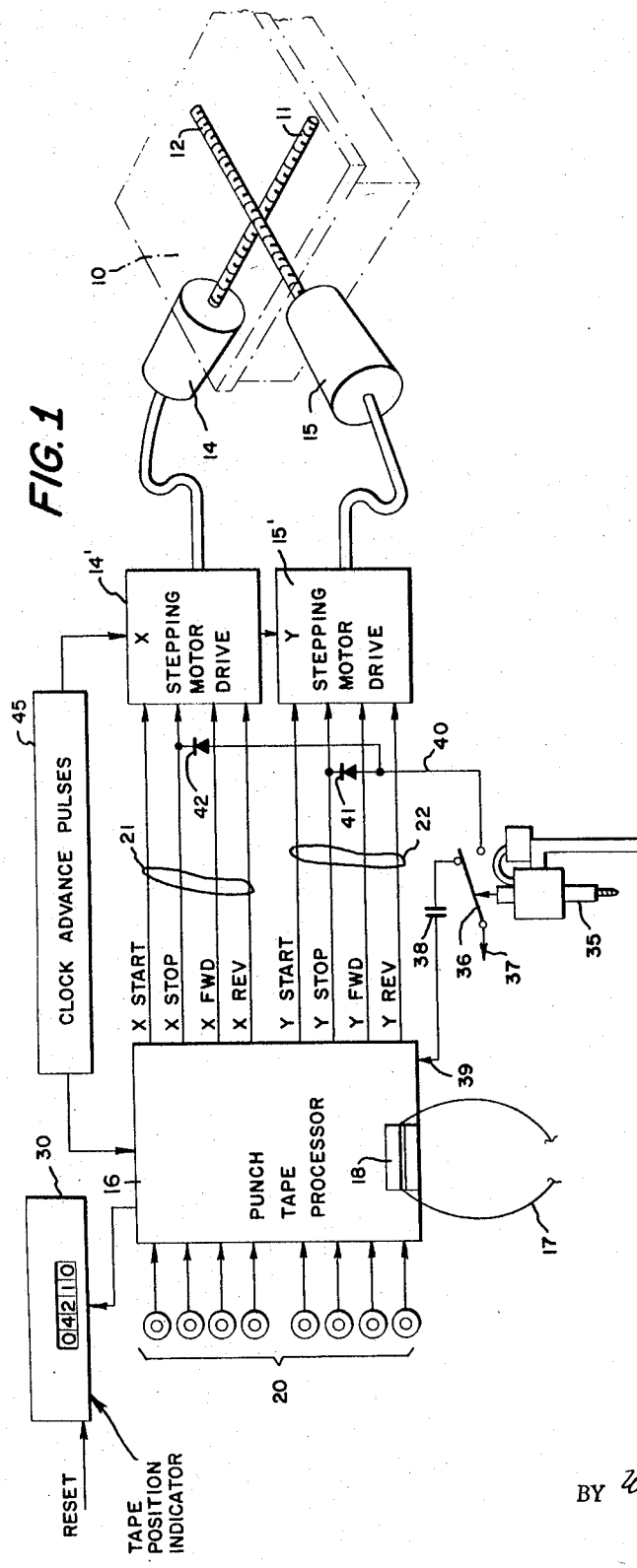
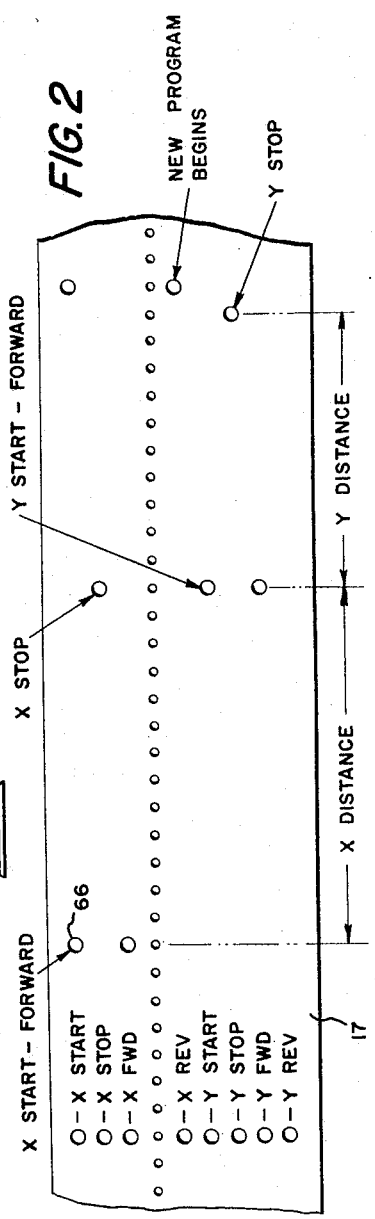
INVENTORS
JOHN PAUL JONES, JR.
LESLIE L. GARDNER
BY *Watson, Cole, Grindle & Watson*
ATTORNEYS

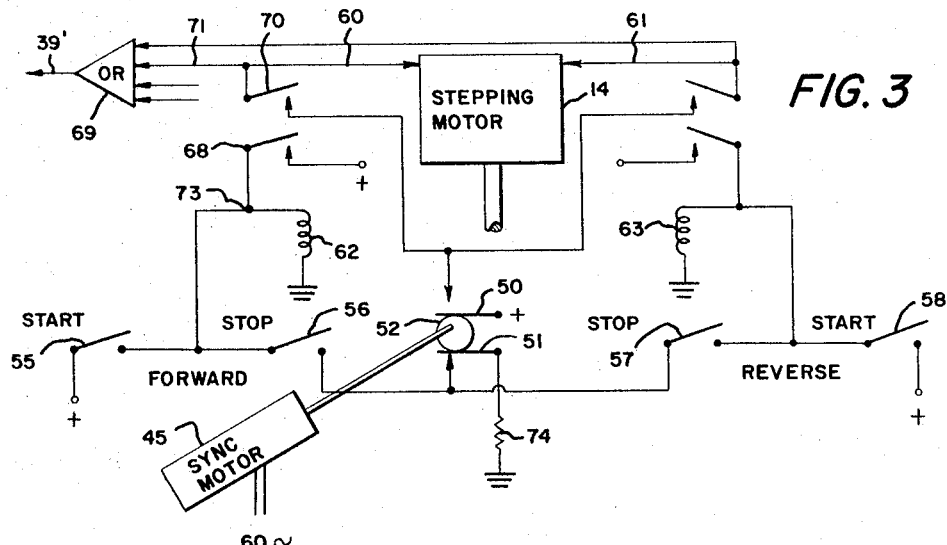
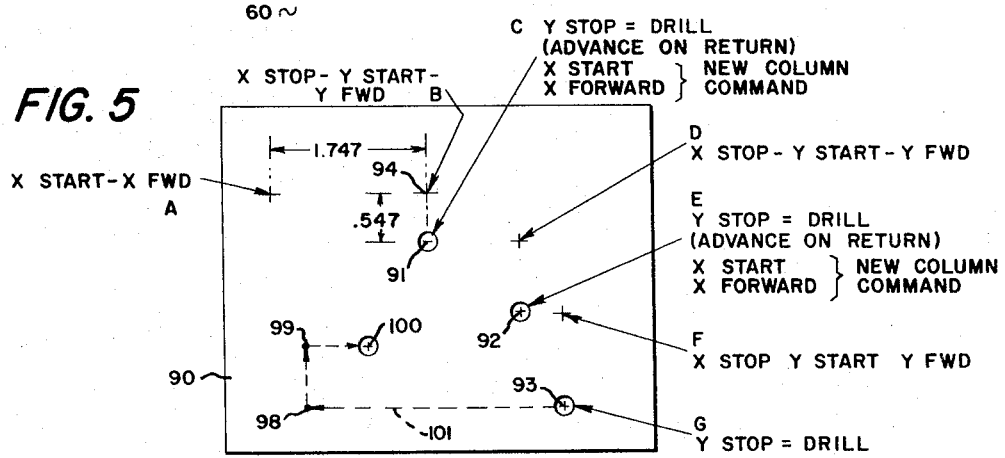
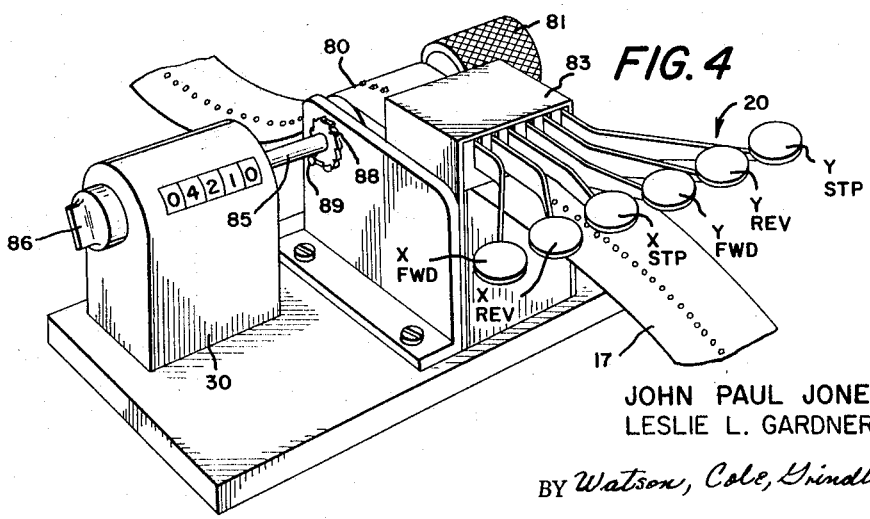
INVENTORS
JOHN PAUL JONES, JR.
LESLIE L. GARDNER
BY Watson, Cole, Grindle & Watson
ATTORNEYS

United States Patent Office 3,297,929
Patented Jan. 10, 1967

3,297,929
TAPE PROGRAMMED MACHINE TOOL
CONTROL SYSTEM
Leslie L. Gardner, Media, and John Paul Jones, Jr., Wynnewood, Pa., assignors to Navigation Computer Corporation, a corporation of Pennsylvania
Filed Dec. 27, 1965, Ser. No. 516,346
9 Claims. (Cl. 318—162)

This invention relates to tape programmed machine controls, and more particularly, it relates to a simplified system of control for automatic machine tools having stepping motors therein operated to precisely position a workpiece for machining operations.

While different types of tape programmed machine controls exist, most are quite complex and require extensive electronic circuitry including tubes or transistors, counters, and complex binary logic or memory circuits. Not only is initial cost of such complex devices prohibitive, but also it is difficult and expensive to operate and maintain such systems, because an electronic expert is not ordinarily available in a machine shop that may employ such control systems, and an extensive operator training program is required to teach machinists principles of digital coding and programming of such devices. Even the time employed in punching codes in conventional devices is expensive, particularly where long tapes with many program steps for moving workpieces in intricate patterns over large distances are employed.

Thus, it is a general object of the invention to provide simplified and improved tape programmed machine controls.

A further object of the invention is to provide machine tool control systems which may be simply programmed by inexperienced personnel without extensive training in new methods or digital techniques and which does not require complex coding equipment such as binary tape punching tapewriters.

A still further object of the invention is to provide machine tool control systems having no complex electronic circuits and therefore so simple that maintenance may be carried out by unskilled non-electronically trained personnel such as machinists.

In this manner machine operators will be capable of programming their own automatic machines without upgrading to a grade comparable with a computer technician and without requiring radically new job skills to attain improved operator ratings and greater job flexibility.

Thus, the present invention provides automatic machine controls that operate directly from standard machine dimensions represented by the program tape without intervening coding, decoding, or electronic signal processing circuits. The tape is prepared by the simple steps of indicating a stepping motor start position for each dimension of workpiece travel, counting the number of incremental steps that are taken before the stepping motor is stopped (which is in essence stating a direct distance measurement) and indicating there the motor stop position. To simplify further the programming, an increment counter is coupled to the tape processor for directly reading the tape (i.e., workpiece movement) distance between the start and stop operations.

Further aspects of the invention, together with typical embodiments of the invention, are described in detail in the following specification with reference to the accompanying drawing, in which:

FIGURE 1 is a schematic diagram of a system incorporating the invention;

FIGURE 2 is a section of a program tape record prepared in accordance with the invention;

FIGURE 3 is a schematic diagram of typical control circuits for operating stepping motors in accordance with the teachings of the invention;

FIGURE 4 is a perspective view of a tape processing unit as used in programming the tape record of FIGURE 3; and FIGURE 5 is a plan layout view of a typical workpiece illustrating simplified program techniques attainable with the invention.

With reference now to FIGURE 1 of the drawing, it may be seen that workpiece holding table 10 is positioned in two dimensions X and Y by respective lead screws 11, 12, which in turn are rotated in incremental steps by the corresponding stepping motors 14, 15 and corresponding drive circuits therefor shown in block diagram form 14', 15'. Appropriate gearing and dimensioning interconnect the motor with the lead screws to provide the desired machine tolerances. For example, one incremental step of the stepping motor may be used to position the table 0.001".

The complete control system for this automatic machine tool system consists simply of punch tape processor unit 16 which can perforate a tape record 17 or read holes therefrom with a plurality of switches located at the processing head 18. The reader portion for example may be constructed similar to that described in the copending application for Punched Tape Reader, Serial No. 316,840, filed October 17, 1963, while the punch portion is shown in FIGURE 4 and will be hereinafter described.

For purposes of encoding the tape, a set of program command keys 20 is provided, with each key punching holes in a single one of the multiple columns of a conventional eight column paper tape record as shown in FIGURE 2. Each tape column is used to distinguish a program function corresponding to the instruction command leads 21, 22 for operation of the two stepping motor drive circuits 14', 15'. Thus, as each tape column is read, a contact may be closed to direct the corresponding operation by one or more of the stepping motors as indicated by the notation on the command leads 21, 22.

Basically, as seen from consideration of the tape program of FIGURE 2 the principle of operation of this invention that produces simple and non-electronic apparatus is the use of the tape itself as a measuring scale. Thus, it is only necessary to provide command signals for start and stop of the stepping motor (which in the interim is continuously stepping), and the program tape 17 is advanced one code position increment for each incremental step of either of the stepping motors. The auxiliary control signals for forward and reverse may be used if desired, but there are no binary coding combinations on the tape that must be interpreted to indicate the distance that a workpiece is moved. This is accomplished simply by measuring the distance between the start and stop codes on the program tape. As shown by the program of FIGURE 2, the workpiece table thus would be moved thirteen steps (0.013") in the X dimension and ten (0.010") in the Y dimension whereat it will be stopped to await a machining operation. A new program may be initiated thereafter, such as by starting the X motor to move in a reverse direction, after the tape 17 is advanced one incremental step from its programmed stop, as shown in FIGURE 2.

In accordance with this invention, a resetable numerical tape position indicator 30 is provided for counting the number of increments through which the tape is moved. This may be regarded as a fool proof check on programming the tape or conversely might be used as a check of position during a machining operation in process. It may be seen for example by quick reference to FIGURE 4 that in programming a code into the tape 17, the tape may be advanced between start and stop codes a large number of increments without the necessity of punching holes, or mentally counting steps, either of which could introduce errors more frequently than with the designated operation of this feature. Consider for example the setting of dimension 4.210″ which requires passage of 4,210 increments of tape where no punching need occur, but for which the increment count must be accurately maintained. It is clear therefore that the combination of the tape processor and the tape position indicator 30 in this machine tape control system serves to simplify the encoding process so that a machine operator may simply encode an automatic operation in terms of dimensions with which he is ordinarily working. This is discussed in more detail hereinafter with reference to FIGURE 5.

From consideration of the two successive programs of tape 17 in FNGURE 2, it is seen in FIGURE 1 that a drill spindle 35 may be operated either manually after the required workpiece stop position is reached, or automatically by addition of further appropriate spindle control means. However, in either case it is desirable to produce automatic control means such as switch 36 responsive to some predetermined workpiece condition (illustrated in this case as return of spindle 35 to its upward rest position to indicate the drilling operation has been completed). This serves to automatically move the workpiece to the next operational position after the preceding operation is completed. Thus, switch 36 may serve to connect a power source at terminal 37 for one single shot incremental advance of the tape processor until the spindle is again displaced for another operation and returned. This may be accomplished by such means as capacitor 38 in the tape advance lead 39 which sends a single charging pulse into the tape processor each time the interlock switch 36 is closed upon the return of spindle 35. Then, the new program will continue under direction of the next program on tape 17 until the workpiece is stopped in proper position for a further drilling operation.

Additionally, switch 36 may serve as an interlock to assure the stepping motors are stopped during the drilling operation by means of stop instructions at lead 40 to both motors. In such a circuit mixer diodes 41, 42 are used to avoid connection of the stop lines of both motors together.

It is necessary in the mode of operation afforded by this invention to synchronize the incremental stepping of the tape and stepping motors at some predetermined rate within the operational capacity of the system employed which will position the workpieces quickly in place. Thus, a clock advance pulse source 45 is used to synchronously step both the tape processor 16 and the stepping motors 14, 15 together at a predetermined stepping rate. In this manner the tape 17 and the motors 14, 15 incrementally advance together and stop together in a manner such as obtained by the typical control circuit of FIGURE 2 used to illustrate the synchronous start, stop, forward, and reverse controls of the stepping motor 14. The source of clock pulses 45 may constitute a synchronous motor coupled to a 60 cycle power line and operating electrical contacts 50, 51 from an appropriate cam geared to the appropriate speed for operation of a tape advancing mechanism connected at lead 39′ as well as the stepping motor 14.

Each of the function control switches 55, 56, 57, 58 may be punch tape hole sensing switches within tape processor 16 for respective functions similar to those represented in the group of leads 21 in FIGURE 1. Stepping motor forward and reverse drive leads 60, 61 are respectively actuated by corresponding forward and reverse control relays 62, 63, which operate from their respective start and stop switches in similar manner for stopping and starting the respective stepping motor and continuously clocking incremental advance in either direction therebetween. This operation may be understood by considering the forward operational cycle initiated by closing start forward contact 55, as the tape in an appropriate single column presents a marker such as the punch hole 66 of FIGURE 2. It is to be recognized that other control circuits may be used and other functional contact configurations without departing from this invention, depending upon the type and nature of stepping motor used and the required controls thereto. One simple form of stepping motor for example could comprise simply a reversible magnet operated ratchet and pawl assembly operated in different directions by separate magnetic solenoids connected to leads 60 and 61 respectively. Such stepping motors are found in widespread commercial use in stepping switches, for example, and other types of conventional stepping motors may be adapted to this invention by those skilled in the art.

In this typical control circuit, as start contact 55 is closed, relay 62 is energized and held in this position by holding contact 68 to transmit by the other contact 70, the periodic clock pulses derived at cammed switch contact 50 both directly to the stepping motor 14 and to the punch tape reader at lead 39′ via lead 71 of mixer circuit 69. Thus, both the stepping motor 14 and tape processor 16 are incrementally stepped along until tape 17 presents a stop marker closing contact 56. This serves to ground terminal 73 of relay coil 61 through current limiting resistor 74 as synchronized contact set 51 is closed. This synchronous control afforded by contact set 51 assures that the stop operation does not occur until after the motor 14 is stepped and completes that operation directed by the associated timing contact set 50. At such time relay contact set 70 opens and neither the tape processor 16 nor the stepping motor 14 advances until another start marker is encountered by switches 55 or 58. Other types of stepping motors may require both the start signal and the forward signal simultaneously such as indicated by the tape program of FIGURE 2, which is prepared by a simple tape punch mechanism such as illustrated in FIGURE 4.

In this programming device, a sprocketed tape advance roller 80 is shown on the tape punch, which may be commonly used to pass the tape by a reading station, and which has a manual advance knob 81 coupled therewith for manually advancing the tape when preparing a program by operation of punch keys 20. Each punch key operates in a punch block 83 to drive a punch pin through a separate column or channel on the presprocketed paper tape 17, which is advanced marker position by marker position incrementally by turning knob 81.

Coupled by shaft 85 to the advance roller 80, is the tape position indicator 30 hereinbefore described, which may be a conventional mechanical counter assembly having a reset knob 86 for returning the count to zero. There is a detent mechanism to define each marker position on the tape and to stop counter 30 exactly on the corresponding count, such as indicated by detent wheel 88 and spring arm 89. It may be seen therefore that little instruction is needed with no special skills or fast typing speeds required for preparing program tape with this assembly.

A typical procedure used in preparing a program tape may be illustrated by reference to FIGURE 5, where the simple program steps A, B, C, etc. are followed to lay out the pattern in a typical workpiece plate 90 which is to be drilled at positions 91, 92, and 93. Every operation must begin from a predetermined reference stop position such as designated at A. The first drilling position 91 then is simply measured in X and Y dimensions in the same manner that a machinist uses to locate that position in his normal layout operation. Here typical dimensions 1.747″ and .547″ are shown with intermediate program position B. Accordingly, the initial tape program step would be punched X start, X forward, and the tape and counter 30 would be advanced 1,747 increments without another entry before punching program step B. This would bring the workpiece to position 94 on the workpiece 90, and would position the program tape accurately to receive designated program instruction B. The counter 30 may be reset at this time to read the next distance directly while avoiding arithmetic operations while the tape and counter are readvanced 547 increments to position 91, etc.

It is noted that even this simple programming method permits antibacklash techniques. Thus, each motor is advanced in the same direction (forward) to reach the next position, and simple programming steps by addition of further programmed points 98 and 99 can be used to avoid reversal of the stepping motors in reaching a new position 100 appearing after step G where the path proceeds as shown by dotted arrows 101. For purposes of simplicity the advance of X and Y motors have been discussed in sequence, but it is obvious that they may both be operated concurrently from side by side programs on their respective tape channels to reduce operation time.

Having therefore provided a simplified control system for automatic tool operation, which attains a high degree of accuracy and does not forego the necessary advantages of more complex systems, those features believed descriptive of the nature and scope of the invention are defined with particularity in the appended claims.

What is claimed is:

1. In an automatic machine tool control system having two stepping motors connected for incrementally positioning a workpiece in two dimensions, a source of periodic timing pulses, a multichannel digital tape processor for passing a tape record incrementally through a sequence of marker positions identified by a marker at start and stop positions generally encompassing a length of tape between the start and stop positions directly proportional to the length of movement of the workpiece, selective means responsive synchronously with said timing pulses for incrementally stepping each motor, means reading said start and stop positions on said tape with said processor while moving the tape incrementally one marker position at a time in synchronous response to said timing pulses only when and simultaneously as either motor is being stepped, means responsive to said start and stop marker signals read in different channels on the tape for respectively controlling the starting and stopping of each motor, and a program tape record providing a series of incremental steps between motor start and stop signals on separate tracks for individual control of each of said motors to thereby step said motors a metered distance to direct a change of position of the workpiece one increment for each marker position on the tape between said start and stop markers.

2. A system as defined in claim 1 including an interlock switch operated by the machine tool when it attains a predetermined condition, and wherein the tape has two successive programs ending on one increment and starting on the next with means advancing the tape reader a single increment upon operation of the interlock switch to initiate the new program starting on said tape record.

3. A system as defined in claim 1 wherein the tape processor has a position indicator signifying each incremental program position of a program tape being processed therein.

4. A system as defined in claim 3 wherein the tape processor includes means for manually entering a program marker upon a tape record in any selectable incremental marker position, and the position indicator is calibrated to signify the distance through which a workpiece passes.

5. A system as defined in claim 1 including program channels designating forward and reverse operation of said stepping motors wherein said means responsive to the marker signals controls the direction of rotation of said motors.

6. In an automatic machine tool control system, a plurality of stepping motors coupled for incrementally positioning a workpiece, a program record tape having on each of a plurality of channels a sequence of incremental distance markers successively spaced therein between detectable start and stop marks, a multi-channel processor for advancing the record tape through a sequence of successive marker positions, means simultaneously advancing the stepping motors and record tape one increment at a time between said stop and start marks on the tape, and a tape position indicator coupled to said processor to move with the tape and numerically signify each successive marker position.

7. In an automatic machine tool control system having at least one stepping motor connected for incrementally positioning a workpiece, a digital record tape having recorded thereon stop and start markers separated by a designated number of blank incremental marker positions for each program, a digital tape processor for passing said tape record incrementally one position at a time whenever the motor is stepped through one increment, means stepping the motor at a predetermined periodic rate between said markers, means starting the tape processor for a new program by incrementally moving said tape processor one position from a preceding stop marker on the tape and means stopping the stepping motor and said tape simultaneously when said stop marker is encountered on said tape.

8. In an automatic tool control system, a stepping motor with an associated movable mechanism operable to position a workpiece a distance proportional to the number of steps over which the motor is advanced, cyclic means operating the stepping motor at a predetermined stepping rate, selective control means coupling the cyclic means to said motor to position said workpiece, a program tape marked with a first signal marker for starting the motor and a further signal marker for stopping the motor separated from the first marker by a number of unmarked incremental steps along the tape directly signifying an associated linear measurement along the workpiece, means moving said tape to said first signal marker, means operating the selective control means to start said motor responsive to the first signal marker, means for decoupling the selective control means responsive to the further signal marker to stop the motor, and means advancing the tape responsive to said cyclic means between the two signal markers at an incremental feed rate proportional to the number of steps taken by said motor.

9. A system as defined in claim 8 wherein a counter is coupled to said tape to indicate the number of incremental steps along the tape.

References Cited by the Applicant
UNITED STATES PATENTS

| | | |
|---|---|---|
| 2,741,732 | 4/1956 | Cunningham. |
| 2,750,548 | 6/1956 | Van Dalen. |
| 2,774,922 | 12/1956 | Thomas. |
| 2,833,941 | 5/1958 | Rosenberg. |
| 2,927,258 | 3/1960 | Lippel. |
| 2,996,348 | 8/1961 | Rosenberg. |
| 2,998,560 | 8/1961 | Mottu. |
| 3,002,404 | 10/1961 | Estabrook. |
| 3,012,156 | 12/1961 | Simmons. |

MAYNARD R. WILBUR, *Primary Examiner.*

R. E. COUNCIL, *Assistant Examiner.*